US009179145B2

(12) United States Patent
Hong et al.

(10) Patent No.: US 9,179,145 B2
(45) Date of Patent: Nov. 3, 2015

(54) CROSS LAYER SPATIAL INTRA PREDICTION

(71) Applicant: Vidyo, Inc., Hackensack, NJ (US)

(72) Inventors: Danny Hong, New York, NY (US); Jill Boyce, Manalapan, NJ (US)

(73) Assignee: Vidyo, Inc., Hackensack, NJ (US)

( * ) Notice: Subject to any disclaimer, the term of this patent is extended or adjusted under 35 U.S.C. 154(b) by 350 days.

(21) Appl. No.: 13/932,594

(22) Filed: Jul. 1, 2013

(65) Prior Publication Data

US 2014/0003509 A1 Jan. 2, 2014

Related U.S. Application Data

(60) Provisional application No. 61/667,233, filed on Jul. 2, 2012.

(51) Int. Cl.

| | |
|---|---|
| ***H04N 7/26*** | (2006.01) |
| ***H04N 19/44*** | (2014.01) |
| ***H04N 19/196*** | (2014.01) |
| ***H04N 19/593*** | (2014.01) |
| ***H04N 19/11*** | (2014.01) |
| ***H04N 19/463*** | (2014.01) |
| ***H04N 19/187*** | (2014.01) |
| ***H04N 19/33*** | (2014.01) |

(52) U.S. Cl.

CPC ......... *H04N 19/00533* (2013.01); *H04N 19/11* (2014.11); *H04N 19/187* (2014.11); *H04N 19/197* (2014.11); *H04N 19/33* (2014.11); *H04N 19/463* (2014.11); *H04N 19/593* (2014.11)

(58) Field of Classification Search

CPC ..... H04N 19/46; H04N 19/122; H04N 19/40; H04N 19/33; H04N 19/187

See application file for complete search history.

(56) References Cited

U.S. PATENT DOCUMENTS

| | | | | |
|---|---|---|---|---|
| 2007/0019726 | A1* | 1/2007 | Cha et al. | 375/240.12 |
| 2008/0031347 | A1* | 2/2008 | Segall | 375/240.19 |
| 2012/0106636 | A1* | 5/2012 | Kim et al. | 375/240.12 |
| 2012/0114038 | A1* | 5/2012 | Han et al. | 375/240.12 |
| 2012/0170652 | A1* | 7/2012 | Guo et al. | 375/240.12 |
| 2012/0183056 | A1* | 7/2012 | He et al. | 375/240.12 |
| 2012/0201301 | A1* | 8/2012 | Bao et al. | 375/240.14 |
| 2013/0034170 | A1* | 2/2013 | Chen et al. | 375/240.25 |
| 2013/0070859 | A1* | 3/2013 | Lu et al. | 375/240.25 |
| 2013/0272402 | A1* | 10/2013 | Tu et al. | 375/240.13 |
| 2013/0329789 | A1* | 12/2013 | Wang et al. | 375/240.12 |
| 2014/0003495 | A1* | 1/2014 | Chuang et al. | 375/240.02 |
| 2014/0133558 | A1* | 5/2014 | Seregin et al. | 375/240.12 |

* cited by examiner

*Primary Examiner* — Jay Patel
*Assistant Examiner* — Neil Mikeska
(74) *Attorney, Agent, or Firm* — Baker Botts, LLP

(57) ABSTRACT

Techniques for video decoding include cross-layer prediction from a base layer to an SNR or spatial enhancement layer of spatial intra prediction mode information. In one example embodiment, the Most Probable Mode (MPM) for intra prediction of an enhancement layer block is predicted from the spatially corresponding base layer block.

21 Claims, 8 Drawing Sheets

4 5 0 7 3
6
1
102 8 101

CROSS LAYER SPATIAL INTRA PREDICTION

CROSS-REFERENCE TO RELATED APPLICATIONS

This application claims the benefit of priority to U.S. Provisional Application Ser. No. 61/667,233, filed Jul. 2, 2012 and entitled "Cross Layer Spatial Intra Prediction", which is hereby incorporated by reference herein in its entirety.

FIELD

The disclosed subject matter relates to scalable image or video compression techniques where the direction information of base layer intra prediction of a given sample can be used for the prediction of the intra prediction direction of a corresponding enhancement layer sample.

BACKGROUND

Subject matter related to the present application can be found in co-pending U.S. patent application Ser. No. 13/529,159, filed Jun. 21, 2012 and entitled "Scalable Video Coding Techniques", which is incorporated herein in its entirety.

Video coding, as discussed herein, refers to techniques where a series of uncompressed pictures is converted into a compressed video bitstream. Video decoding refers to the inverse process. Many image and video coding standards such as ITU-T Rec. H.264, "Advanced video coding for generic audiovisual services", March 2010, available from the International Telecommunication Union, Place de Nations, CH-1211 Geneva 20, Switzerland (ITU), and at http://www.itu.int/rec/T-REC-H.264, and incorporated herein by reference in its entirety, or ITU-T Rec. H.265, "High Efficiency Video Coding" (HEVC), April 2013, available from the ITU, and at http://www.itu.int/rec/T-REC-H.265, can specify the bitstream as a series of coded pictures. In such standards, each coded picture can be described as a series of blocks, such as macroblocks in H.264, and largest coding units in HEVC. The standards can further specify the decoder operation on the bitstream.

In video decoding according to H.264, for example, two coding modes can be identified, namely, "inter mode" and "intra mode." Inter mode can refer to the coding of samples, blocks, or pictures relative to previously coded or decoded pictures or parts thereof, using techniques commonly referred to as "inter picture prediction." In contrast, intra mode can refer to the coding of samples, blocks, or pictures without inter picture prediction.

While, by definition, there is no inter picture prediction in intra mode, there are mechanisms that can predict between information related to blocks within the same picture or parts thereof, for example, a slice. One of these prediction mechanisms is commonly referred to as "Intra Prediction." Intra prediction refers to the prediction of sample values, for example, a block of samples currently being decoded, based on sample values belonging to (neighboring) blocks that previously have been decoded for the subject picture. The actual sample values of a block under reconstruction can be created by adding, to the predictor, a residual that is coded in the bitstream.

In H.264, intra prediction can use samples from neighboring blocks following a spatial direction coded in the bitstream. FIG. 1 illustrates eight prediction modes that are used for directional spatial prediction in H.264. A ninth prediction mode (not shown in FIG. 1) is DC prediction. Referring to FIG. 1, the eight directional spatial modes (101) can be identified by arrows pointing in the direction from which the prediction samples are taken, and by numerals indicating the symbol that is being coded in the bitstream to refer to the directional spatial mode (102). To code a block in intra mode, a most probable mode (MPM) is derived based on the prediction modes and availability of previously coded or decoded neighboring blocks. If the MPM is chosen to predict the current block (DC prediction), then this is coded by prev_intra4×4_pred_mode_flag (in the case of a 4×4 block) or prev_intra8×8_pred_mode_flag (in the case of an 8×8 block). Otherwise, one of the eight remaining modes is coded using a syntax element consisting of three bits (rem_intra4×4_pred_mode for a 4×4 block or rem_intra8×8_pred_mode for an 8×8 block).

For spatial intra prediction in HEVC, thirty-five intra prediction modes are specified, of which two are used for DC and planar prediction, and the remaining thirty-three are used for directional spatial prediction. FIG. 2 illustrates thirty-three directional spatial modes (201) as arrows indicating the spatial direction from which the prediction sample is copied, and numerals indicating the symbol used to represent the spatial mode (202). Note that mode 0 is used for planar prediction and mode 1 for DC prediction (not illustrated in FIG. 2). To code each prediction unit (PU) in intra mode, three MPMs are derived based on the prediction modes and availability of previously coded or decoded neighboring blocks. If one of the three MPMs is chosen to predict the current PU (this is indicated by prev_intra_luma_pred_flag), the selected MPM is coded by a syntax element representing an index to one of the three MPMs (mpm_idx=0, 1, or 2), which indicates that the intra spatial directional prediction mode is equal to the selected MPM. Otherwise, the intra spatial directional prediction mode is one of the thirty-two remaining modes, and its value is coded by a syntax element that is a fixed length, five bit field (rem_intra_luma_pred_mode). With the five bits, values between 0 through 31, for a total of 32 values, can be represented.

Excerpts of the HEVC coding_unit syntax and semantics are shown below, which illustrate the described intra prediction direction coding mechanism in the language used by the HEVC standard.

SYNTAX TABLE

| coding_unit( x0, y0, log2CbSize ) { | Descriptor |
|---|---|
| . . . | |
| pbOffset = ( PartMode = = PART_NxN ) ? ( nCbS / 2 ) : nCbS | |
| for( j = 0; j < nCbS; j = j + pbOffset ) | |
| for( i = 0; i < nCbS; i = i + pbOffset ) | |
| prev_intra_luma_pred_flag[ x0 + i ][ y0 + j ] | ae(v) |
| for( j = 0; j < nCbS; j = j + pbOffset ) | |
| for( i = 0; i < nCbS; i = i + pbOffset ) | |
| if( prev_intra_luma_pred_flag[ x0 + i ][ y0 + j ] ) | |
| mpm_idx[ x0 + i ][ y0 + j ] | ae(v) |
| Else | |
| rem_intra_luma_pred_mode[ x0 + i ][ y0 + j ] | ae(v) |
| . . . | |

Semantics Specification: The syntax elements prev_intra_luma_pred_flag[x0+i][y0+j], mpm_idx[x0+i][y0+j] and rem_infra_luma_pred_mode[x0+i][y0+j] specify the intra prediction mode for luma samples. The array indices x0+i, y0+j specify the location (x0+i, y0+j) of the top-left luma sample of the considered prediction block relative to the top-left luma sample of the picture. When prev_intra_luma_pred_flag[x0+i][y0+j] is equal to 1, the intra prediction mode is inferred from a neighboring intra-predicted prediction unit according to subclause 8.4.2.

Spatial and SNR scalable coding can refer to techniques where a coded picture at a highest resolution/quality is represented by at least two pictures, one coded in a base layer bitstream and the others in at least one enhancement layer bitstream. In SNR scalability, the spatial resolutions of the pictures of the various layers are the same, whereas in spatial scalability, the enhancement layer resolution can be higher than the base layer resolution, requiring, for example, upsample filters or similar techniques to enable the reconstruction of an enhancement layer from an already reconstructed base layer. Except for this difference, spatial and SNR scalability can utilize similar techniques, including intra prediction mechanisms.

H.264 specifies techniques for spatial and SNR scalable coding in its Annex G, also known as Scalable Video Coding or SVC. Annex G specifies many different cross-layer prediction techniques that utilize similarities between the coding decisions of a base layer and an enhancement layer encoder (which can result from the coded material being the same for both encoders). However, SVC does not specify prediction of spatial intra coding modes between layers. Under development is a second version of H.265, referred to as Scalable High Efficiency Video Coding (SHVC). A working draft of SHVC can be found at http://phenix.int-evry.fr/jet/doc_end_user/documents/13_Incheon/wg11/JCTVC-M1008-v1.zip.

SUMMARY

The disclosed subject matter, in one embodiment, provides for techniques for cross-layer prediction of a directional spatial intra prediction mode.

In the same or another embodiment, a Most Probable Mode (MPM) of an enhancement layer block can be set to the spatial intra prediction mode of the spatially corresponding base layer block.

In the same or another embodiment, a non-MPM enhancement layer spatial intra prediction mode of a block can be predicted from the base layer's spatial intra prediction mode, and a difference can be coded in the enhancement layer bitstream to specify any deviation from the base layer's spatial intra prediction mode.

The techniques described herein can be implemented using various computer software and/or system hardware arrangements.

BRIEF DESCRIPTION OF THE DRAWINGS

Further features, the nature, and various advantages of the disclosed subject matter will be more apparent from the following detailed description and the accompanying drawings in which.

Figure 1:
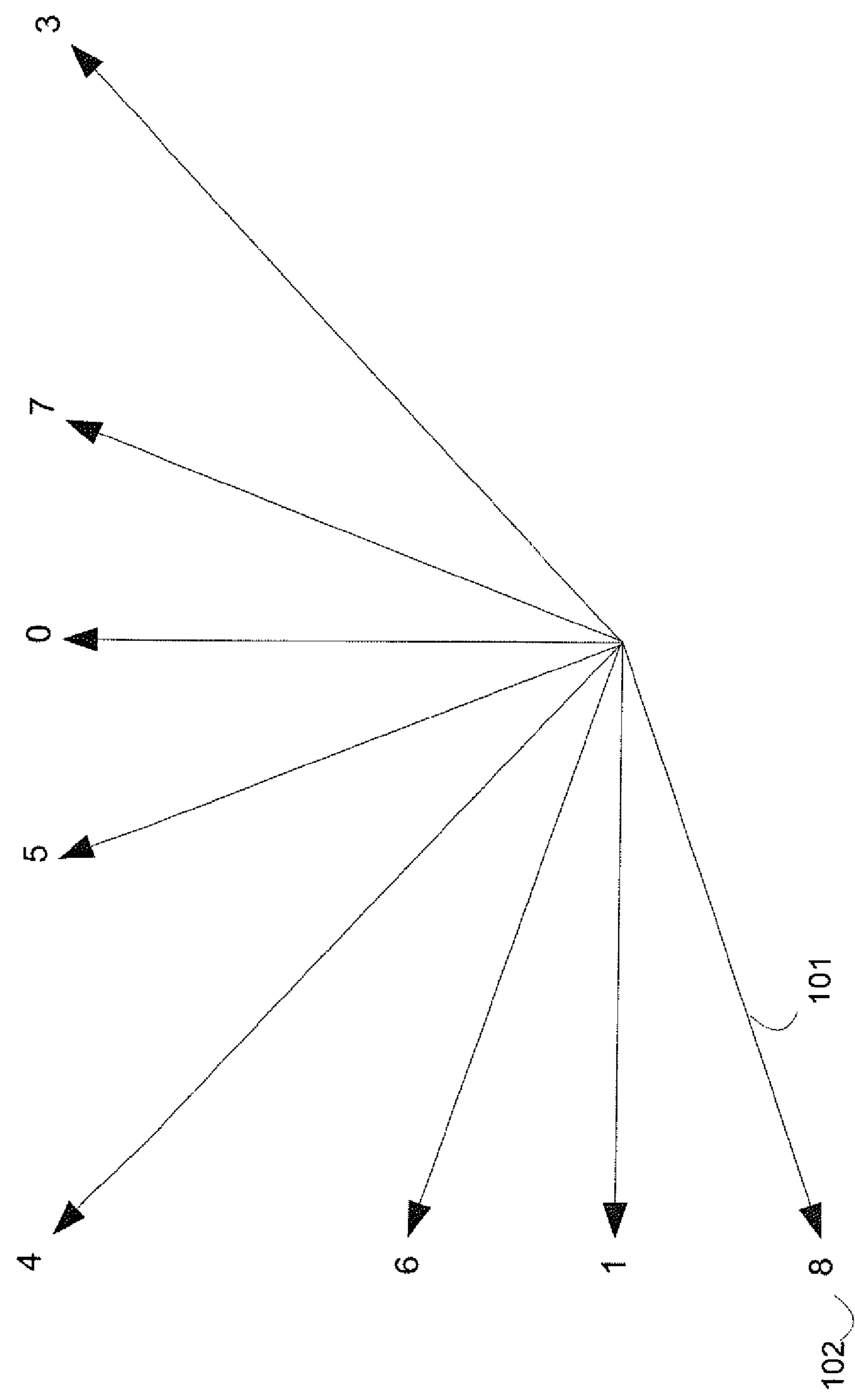
FIG. 1 is a schematic illustration of directional spatial intra prediction modes in accordance with prior art.

The Figures are incorporated and constitute part of this disclosure. Throughout the Figures, the same reference numerals and characters, unless otherwise stated, are used to denote like features, elements, components or portions of the illustrated embodiments. Moreover, while the disclosed subject matter will now be described in detail with reference to the Figures, it is done so in connection with the illustrative embodiments.

DETAILED DESCRIPTION

The coding efficiency of the coding of spatial intra coding modes can depend on how well the most probable mode(s) (MPM(s)) are derived and used. The disclosed subject matter provides techniques for cross-layer prediction of a directional spatial intra prediction mode, e.g., by using base layer intra spatial prediction mode information in the derivation of an MPM for an enhancement layer. Such techniques have particular applicability in scenarios where a large percentage of blocks are intra coded, for example, because the highly active sequence requires intra coding for coding efficiency, or, because intra mode is chosen for error resilience purposes, or, because a full intra picture is being decoded in both layers. In these and other scenarios, using base layer intra spatial prediction mode information for the derivation of the enhancement layer MPM or the direction in non-MPM intra prediction can save bits otherwise used for coding the direction information without inter layer prediction.

An exemplary embodiment of the disclosed subject matter is described in the context of a multi loop decoding of a spatial or SNR enhancement layer, with inter-layer prediction from a reference layer. The reference layer can be a base layer or a lower enhancement layer. The disclosed subject matter can be applied to single loop scenarios and/or with other scalability techniques other than temporal scalability.

Figure 7:
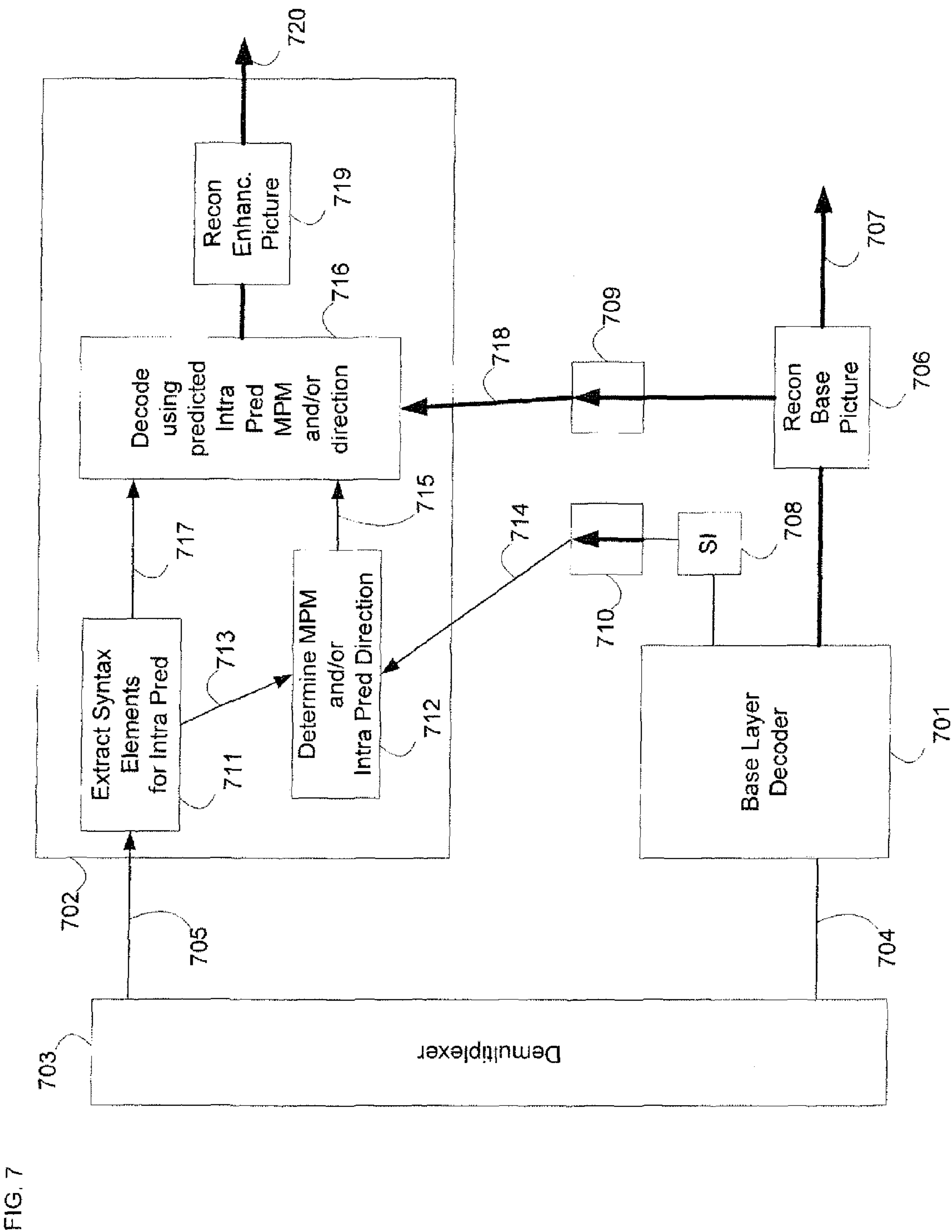
FIG. 7 is a schematic illustration of an exemplary video coder in accordance with an embodiment of the present disclosure.

FIG. 7 shows is a block diagram of an exemplary decoder in which the disclosed subject matter can be applicable. More details about the mentioned decoder can be found, for example, in co-pending U.S. patent application Ser. No. 13/529,159.

Referring to FIG. 7, decoder according to the disclosed subject matter can contain two or more sub-decoders: a base layer decoder (701) for base layer decoding, and one or more enhancement layer decoders (702) for enhancement layer decoding. FIG. 7, for example, depicts a decoder containing a base layer decoder (701) and one enhancement layer decoder (702).

The scalable bitstream can be received and split into base layer bits (704) and enhancement layer bits (705) by a demultiplexer (703). The base layer bits (704) can be decoded by the base layer decoder (701), for example, by using the inverse of the encoding process used to generate the base layer bitstream, for example, in accordance with, e.g., H.264 or HEVC. A person skilled in the art can readily understand the relationships between an encoder, a bitstream, and a decoder.

The output of the base layer decoder (701) can be a reconstructed picture, or parts thereof (706). In addition to its use in enhancement layer decoding, as described below, the reconstructed base layer picture (706) can also be output (707) and used by the overlying system. The base layer decoder (701) can further produce side information (708), for example, metadata including properties associated with the reconstructed base layer picture (706), e.g., in accordance with the disclosed subject matter, or intra mode information including spatial prediction direction information pertaining to base layer reconstructed picture samples or blocks.

The decoding of enhancement layer bits (705) in accordance with the disclosed subject matter can commence when samples of the reconstructed base layer (706), or parts thereof, and associated side information (708), in particular intra prediction information that are referred to by a given enhancement layer block are available in the reconstructed base layer picture and associated side information. Base layer and enhancement layer decoding can occur in parallel and can involve a partially decoded base layer picture. However, in the exemplary embodiments of the disclosed subject matter discuss herein, the base layer picture (706) and associated side information (708) have been reconstructed in their entireties.

The base layer reconstructed picture (706), or parts thereof, can be upsampled in an upsampling unit (709), for example, to the resolution used in the enhancement layer. The upsampling can occur, e.g., in a single batch, or on the fly, as needed. Similarly, the side information (708), if available, can be upscaled by an upscaling unit (710).

The enhancement layer bitstream (705) can be input to the enhancement layer decoder (702). The enhancement layer decoder can, for example, for each sample or block, use the upscaled side information of the base layer, including, e.g., the intra prediction information contained therein, to predict the information used for intra prediction in the decoding of the enhancement layer, as described in more detail below.

The enhancement layer decoder (702) can include an extractor (711), which can extract the control information used for intra prediction from the coded enhancement layer bits (705), including, for example, the coded direction information or the selection of one or more most probable modes. The extractor also can be part of the overall bitstream parsing mechanism of the enhancement layer decoder (702).

The intra prediction control information (713) extracted by the extractor (711) can be forwarded to an enhancement layer intra prediction determination module (712). The module (712) can further receive side information (714), which may be upscaled, from the base layer decoder (701), which can include, e.g., the base layer's intra prediction control information. The module (712) can use parts or all of the base layer side information (714) as a predictor to predict the intra prediction information used for reconstruction of the enhancement layer, and can correlate the enhancement layer intra prediction control information (713) as a "residual" that, in conjunction with the predictor and correlated as described below, can form the intra prediction information (715) used by an enhancement layer decoding engine (716).

The enhancement layer decoding engine (716) can be part of the enhancement layer decoder (702), and can reconstruct the reconstructed enhancement layer picture (719), and output the reconstructed enhancement layer picture (720), utilizing, e.g., enhancement layer bits from which the intra prediction information was extracted (717), intra prediction information (715), and potentially base layer samples (718), which may be upscaled.

Figure 2:
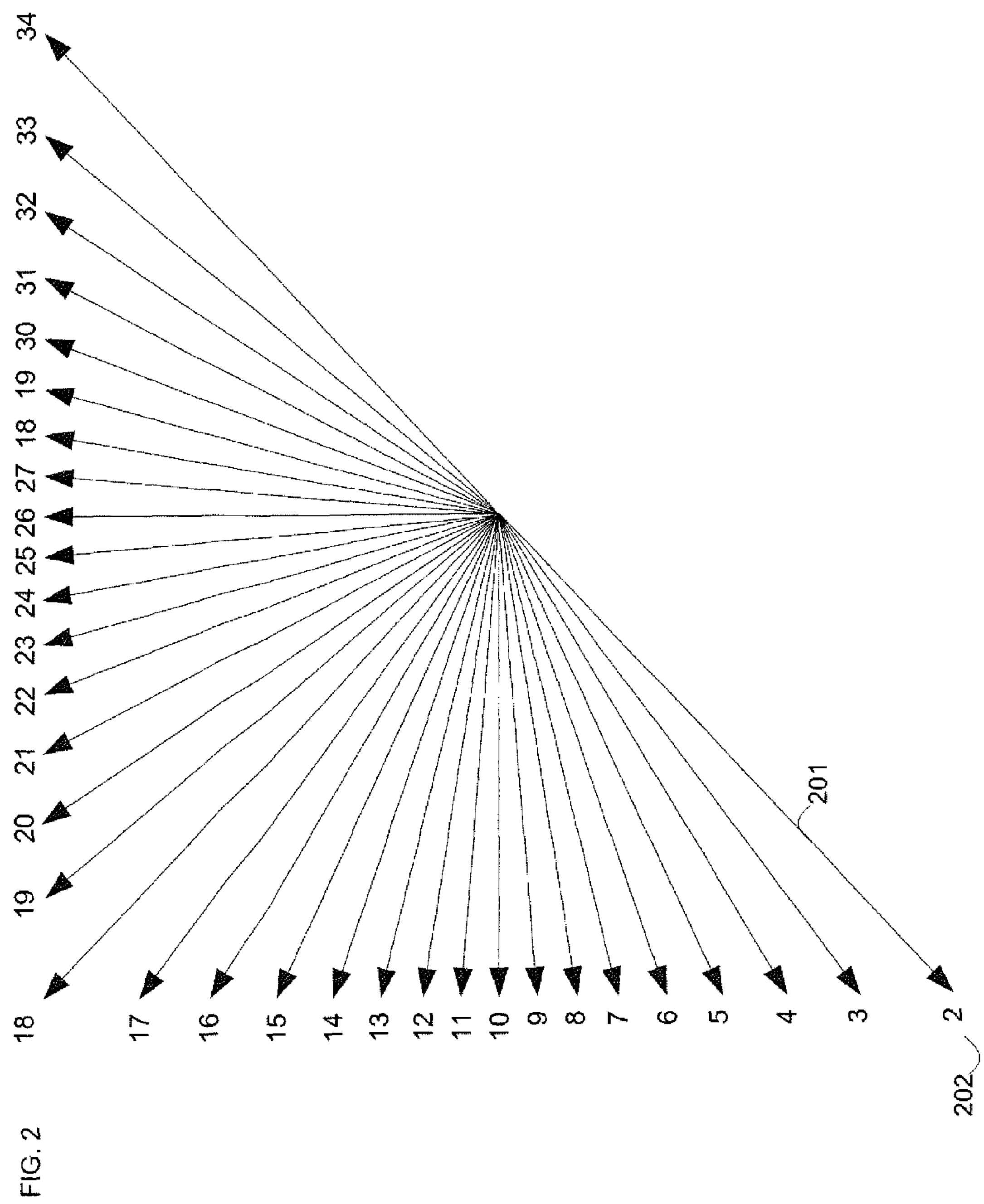
FIG. 2 is a schematic illustration of directional spatial intra prediction modes in accordance with prior art.
Figure 3:
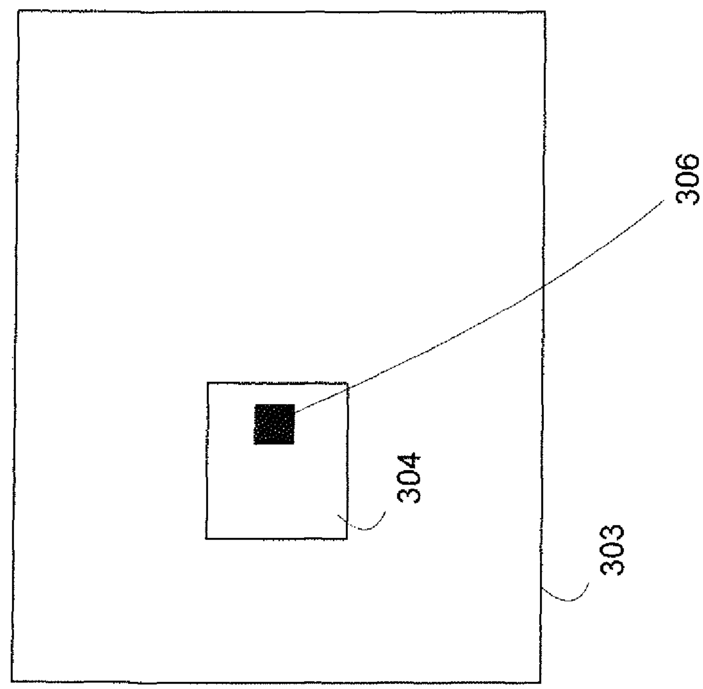
FIG. 3 is a schematic illustration of spatially corresponding blocks in a base layer and enhancement layer picture in accordance with prior art.
Figure 3:
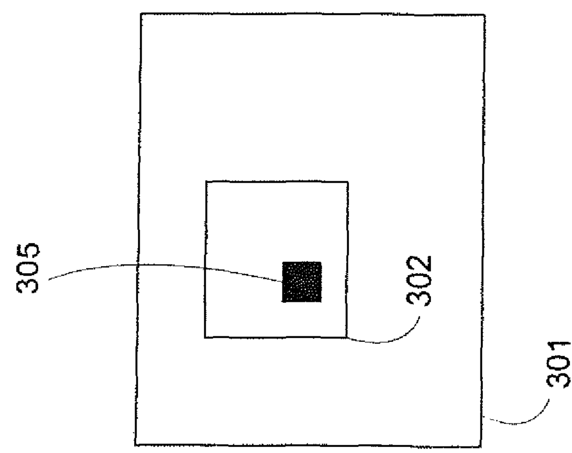

FIG. 3 shows an exemplary base layer (BL) picture (301) and base layer intra block (302), coded in a directional spatial mode, e.g., one of the modes (101 or 201) illustrated in FIG. 1 or 2. FIG. 3 also shows an enhancement layer (EL) picture (303) and enhancement layer intra block (304). The enhancement layer picture (303) can be the same size as the base layer picture (301), e.g., SNR scalability is used, or can be a different size than the base layer picture (301). The exemplary enhancement layer intra block (304) shown in FIG. 3 is the same size as that of the intra block (302) for the base layer. The picture sizes, block sizes, and the ratios between picture size and block size can differ from those shown in FIG. 3, e.g., the intra blocks can be smaller relative to the picture sizes. The size of the enhancement layer block, if coded in HEVC, can be different. The directional information for intra prediction, as described below, can be derived in a per enhancement layer sample basis. For example, for a given sample (306), located in a block (304) of an enhancement layer reconstructed picture (303), a corresponding sample (305), located in a block (302) of a base layer picture (301), can be determined by reverse downscaling the coordinates of the enhancement layer sample (306). In the case of SNR scalability, for instance, a base layer picture and an enhancement layer picture are the same size. Still, the block size can vary, e.g., due to mode decision processes in the enhancement layer encoder. Nevertheless, the spatially corresponding sample of a given enhancement layer and its intra prediction direction information can be derived if certain information about the base layer is known.

The enhancement layer sample can be statistically likely to follow the same or similar directional prediction as the base layer sample because both the enhancement and base layers can represent the same source material. Where the intra prediction mode information of the base layer is made available to the enhancement layer decoder, e.g., through the side information mechanism described above, an exemplary enhancement layer decoder, in accordance with the disclosed subject matter, utilizes the base layer intra prediction mode information to derive the enhancement layer intra prediction mode information. If the enhancement layer intra prediction mode information is coded using the base layer information it can be coded in fewer bits, as the prediction can remove redundancy.

Figure 4:
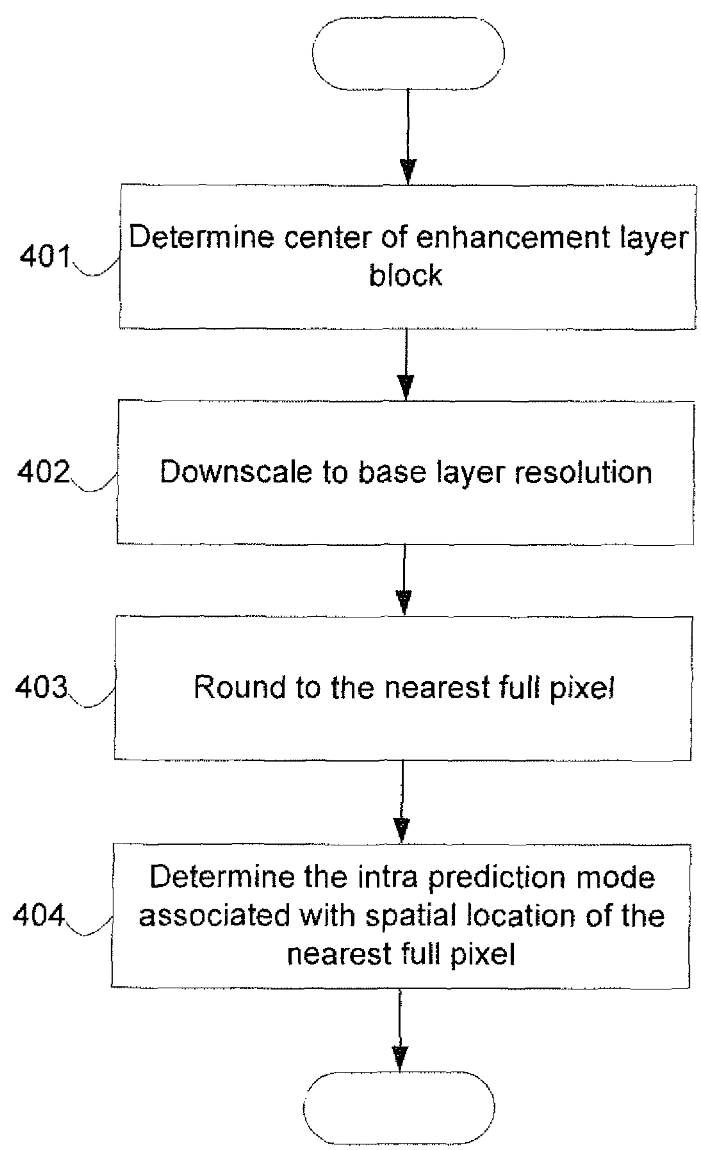
FIG. 4 is a flow diagram illustrating a procedure for an exemplary base layer intra prediction mode derivation module in accordance with an embodiment of the present disclosure.

FIG. 4 shows a flow diagram that indicates an exemplary procedure for determining intra prediction direction for a sample or block of samples of an enhancement layer based on the intra prediction direction of a corresponding sample or block of samples of a base layer, in accordance with the disclosed subject matter. The exemplary procedure takes advantage of the fact that intra prediction information can be coded in base and enhancement layer bitstreams on a per block basis, e.g., in HEVC and SHVC.

First, the spatial address e.g., coordinates, of the center of the EL block currently being decoded is determined (401). For example, one half of the respective block size—which is known to the decoder—can be added to both the x and y coordinates of the upper left corner of the block. This spatial address is scaled to BL resolution (402), e.g., the inverse of the upscale mechanism. The result, after rounding (403), is a corresponding spatial location of a pixel in the BL. The intra prediction mode of this BL pixel can be determined (404), e.g., using side information, and can be used as a predictor for decoding the EL prediction mode, e.g., deriving every reconstructed sample of the enhancement layer where intra prediction is applicable. Other arrangements for creating a predictor are possible as well.

Different procedures can be used to derive intra prediction information for efficient coding in the enhancement layer, e.g., implemented in an intra prediction determination module in the enhancement layer decoder. In one exemplary embodiment, the procedure can relate to the derivation of a MPM of an enhancement layer block. In the same or another embodiment, the procedure can relate to the prediction of a spatial direction, e.g., where MPM is not used when coding an enhancement layer block.

Figure 8:
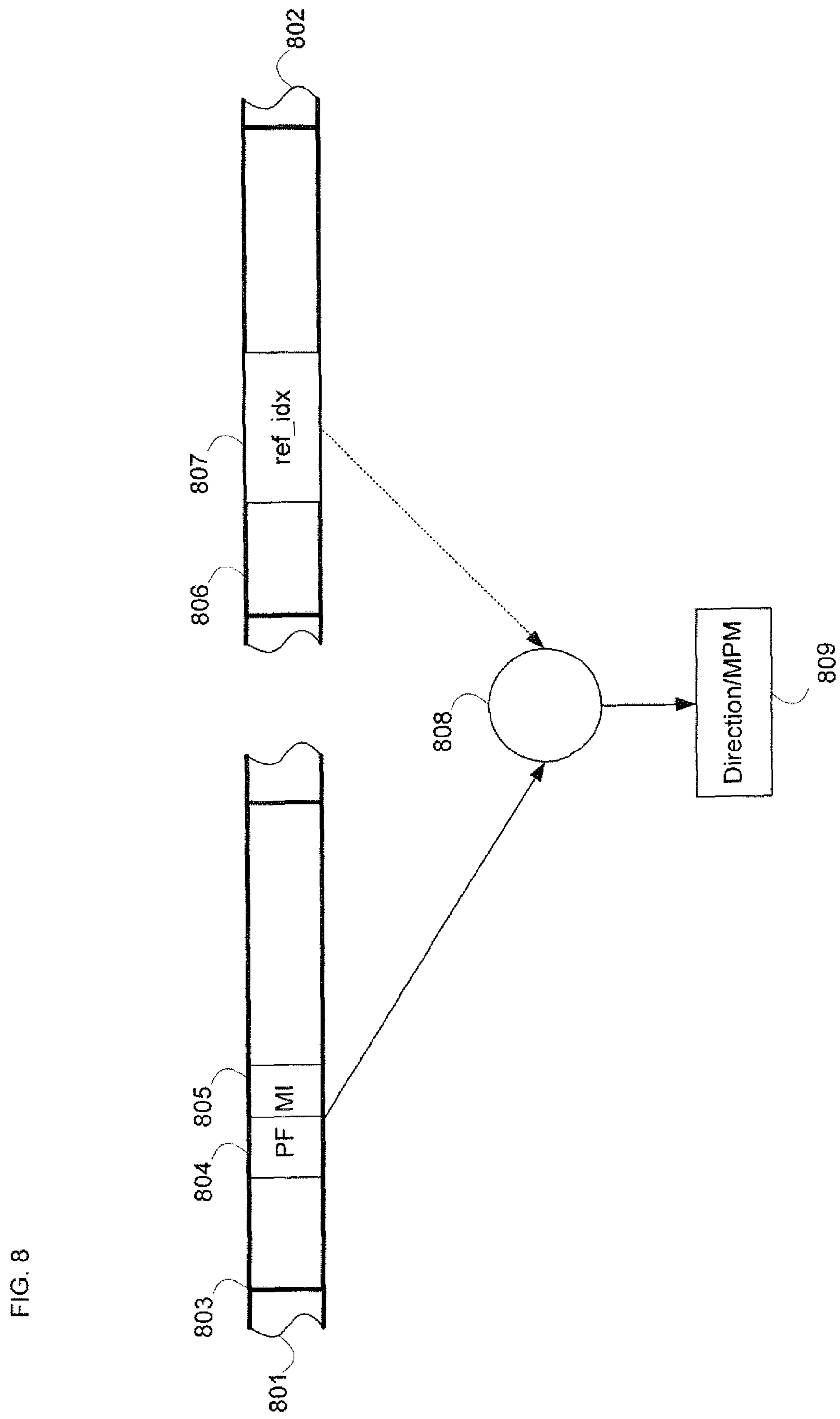
FIG. 8 is a schematic illustration of exemplary cross-layer spatial intra prediction modes in accordance with an embodiment of the present disclosure.

FIG. 8 shows an exemplary base layer bitstream (801) and an exemplary enhancement layer bitstream (802). A coded block (803) identified in the base layer bitstream (801) can include, e.g., information concerning whether intra mode has been chosen by the base layer encoder. In the same or another embodiment, the coded block (803) can include a bit prev_intra-luma_pred_flag (PF) (804) and/or a Most Probable Mode index mpm_idx (MI) (805). Either or both of these syntax elements can indicate the intra spatial prediction mode of the block in question as coded in the base layer in accordance with HEVC standard.

In one embodiment, an MPM for an enhancement layer sample, which also can be the MPM for the enhancement layer block, can be derived from the intra directional spatial prediction mode of the corresponding base layer block. In the same or another embodiment, for a given block, the enhancement layer can use the same MPM or MPMs as used in the corresponding base layer. If multiple MPMs are used, the enhancement layer MPMs can be predicted as discussed above, or can be set to the MPMs derived based on the neighboring block's prediction modes (as in the non-layered case).

In an exemplary encoder in accordance with the disclosed subject matter, once the MPMs have been determined as described above and the intra directional spatial prediction mode determined for the enhancement layer for an individual block or sample, the determined intra directional spatial prediction mode is indicated in the enhancement layer bitstream using the same mechanisms as used for the base layer. For example, for an HEVC base layer, the indication is performed on a per-block basis. If one of three MPMs is chosen to predict the current Prediction Unit block, indicated by prev_intra_luma_pred_flag, the selected MPM is coded by a syntax element representing an index to one of the three MPMs (mpm_idx=0, 1, or 2), which indicates that the selected intra spatial directional prediction mode is equal to the selected MPM. Otherwise, the selected intra spatial directional prediction mode is one of the thirty-two remaining modes, and its value is coded by a syntax element that is a fixed length, five bit field (rem_intra_luma_pred_mode).

In another embodiment, prediction of enhancement layer MPM(s) based on the base layer's coded mode can be mandated in a video coding standard, and enhancement layer syntax can be designed not to include any syntax elements indicating the selected MPM. For example, the selected MPM which corresponds to the base layer's coded mode can be specified.

In the same or another embodiment, the remaining non-MPM spatial intra modes for an enhancement layer block can be determined by using a predictor based on the base layer's spatial intra direction (e.g., in HEVC, the values 2 through 34 (201) shown in FIG. 2) and a difference coding mechanism that can rely on difference information communicated in the enhancement layer bitstream.

Figure 5:
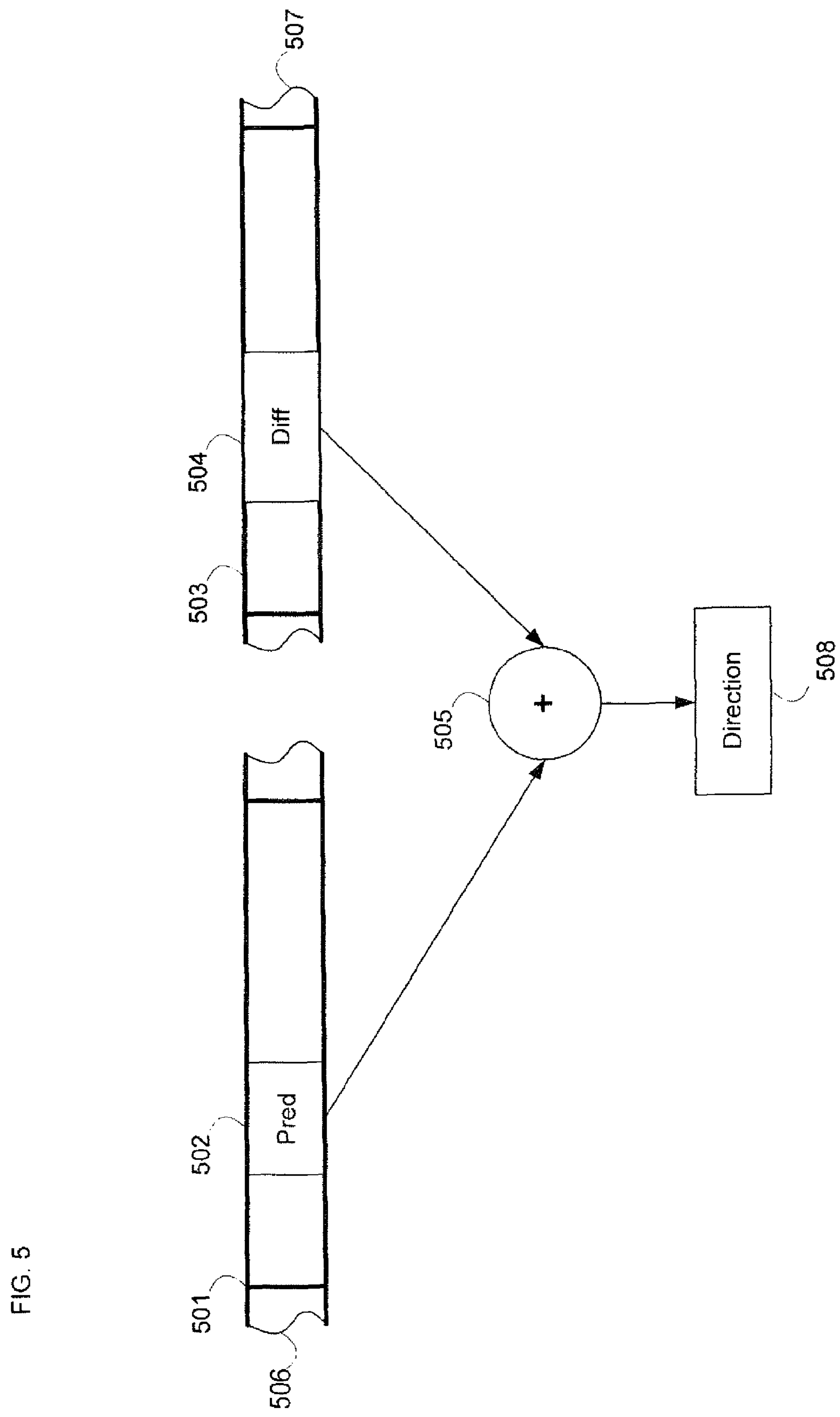
FIG. 5 is a schematic illustration of exemplary cross-layer spatial intra prediction modes in accordance with an embodiment of the present disclosure.

FIG. 5 shows an exemplary base layer coded block (501) in a base layer bitstream (506). The base layer coded block (501) can include information indicating the spatial intra prediction mode for this block (502), which can be used as a predictor in accordance with the disclosed subject matter. This information can include, for example, an indication of the use of an MPM, or an explicit codeword indicating the vector's number (i.e., the mode (102) or (202) shown in FIG. 1 or 2). FIG. 5 also illustrates an exemplary enhancement layer coded block (503) in enhancement layer bitstream (507), which can also include information indicating the spatial intra prediction mode for the block (504).

In the same or another embodiment, the information (504) can be a variable length codeword in a format, as described below, that codes difference information relative to the base layer spatial intra prediction mode (502). The predictor (502) and difference (504) can be added (505) so to generate the intra prediction direction used for decoding of the enhancement layer (508). Variable length codewords can be used, for example, if a short codeword is sufficient to indicate the difference (504) between the predictor (502) and the desired spatial intra coding mode (508).

As one example, the material represented by base layer and enhancement layer can be the same and, therefore, the content characteristics, e.g., spatial intra coding mode can be similar. Therefore, short codewords can be allocated for spatial intra coding mode difference representing approximately the same direction as the predictor. As another example, in HEVC, the direction of the intra prediction modes can monotonically follow the codeword value. That is, taking, for example, the direction of intra prediction mode vector 2 as 0 degrees, the higher the codeword value for the intra prediction mode, the higher the angle is from vector 2.

If a base layer block is coded using, e.g., prediction mode 7 shown in FIG. 2, then modes 6 and 8 can be more likely as prediction modes for the corresponding EL block than, for example, modes 18 and 19. Accordingly, assigning a short variable length codeword for values 6 and 8, relative to the length of the codeword required to indicate modes 18 or 19, can enable coding efficiency.

In the same or another embodiment, for a scalable extension of HEVC, the enhancement layer blocks can be coded using intra prediction tools of the single layer HEVC standard. As described above, when the base layer block is coded in one of the thirty-three intra directional spatial prediction modes, then one of the three MPMs can be set to the spatial directional mode of the base layer block. The other two MPMs can, for example, be set to DC and planar modes, and the remaining thirty-two modes can consist of spatial directional modes that can be differentially coded, e.g., using TABLE 1 below. The modes that are only one or two modes away from the base layer block's mode can be coded using only 3 bits (instead of 5). The modes that are only three or four modes away from the base layer block's mode can be coded using only 4 bits (instead of 5).

TABLE 1

| Prefix | Suffix | Val |
|---|---|---|
| 0 | XX | +/_1, +/_2 |
| 10 | XX | +/_3, +/_4 |
| 110 | XXX | +/_5, +/_6, +/_7, +/_8 |
| 111 | XXXX | +/_9, . . . , +/_16 |

Computer System

The exemplary methods for video coding described above can be implemented as computer software using computer-readable instructions and physically stored in computer-readable medium. The computer software can be encoded using any suitable computer languages. The software instructions can be executed on various types of computers. For example, FIG. 6 illustrates a computer system 600 suitable for implementing embodiments of the present disclosure.

Figure 6:
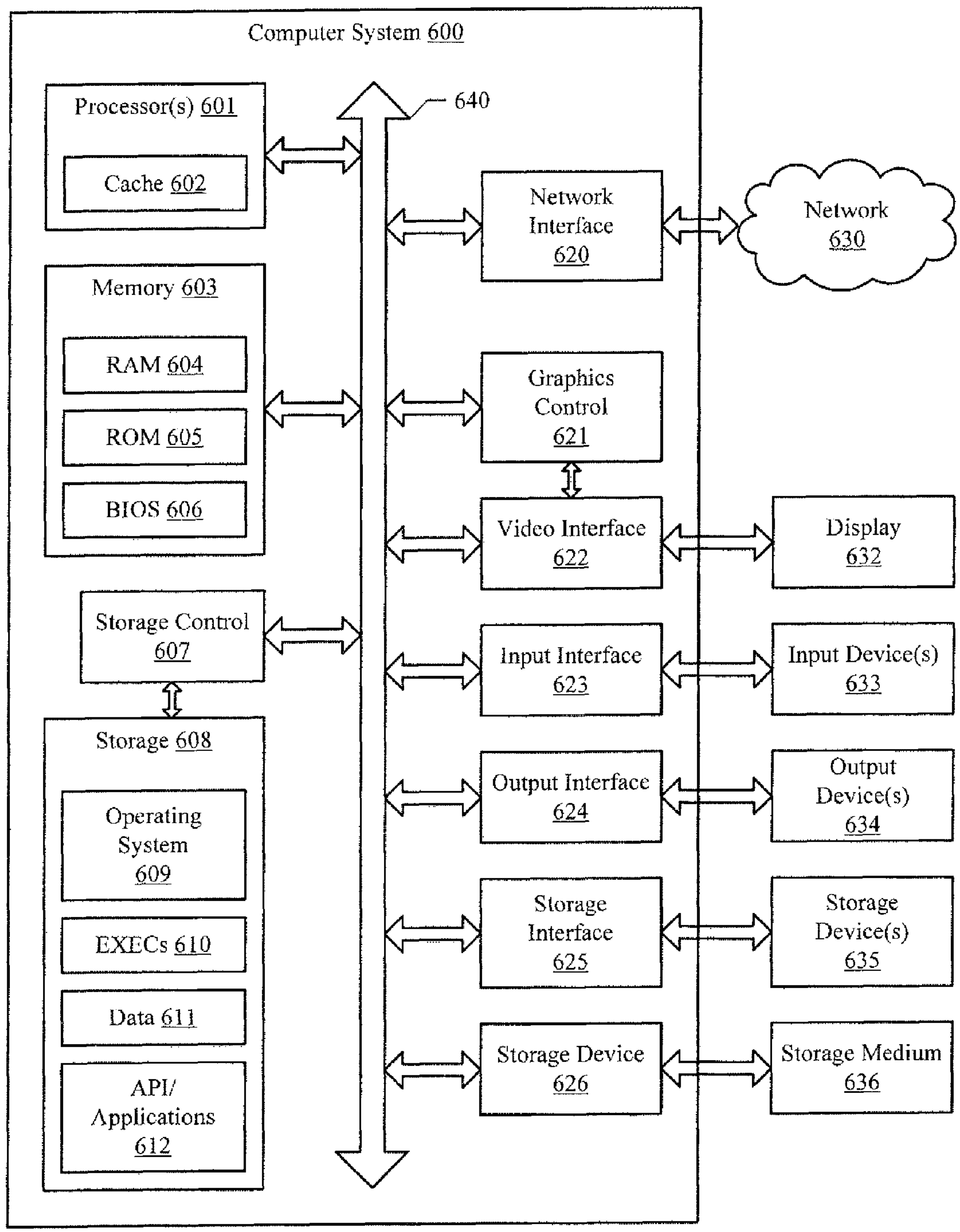
FIG. 6 is an exemplary computer system in accordance with an embodiment of the present disclosure.

The components shown in FIG. 6 for computer system 600 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system. Computer system 600 can have many physical forms including an integrated circuit, a printed circuit board, a small handheld device (such as a mobile telephone or PDA), a personal computer or a super computer.

Computer system 600 includes a display 632, one or more input devices 633 (e.g., keypad, keyboard, mouse, stylus, etc.), one or more output devices 634 (e.g., speaker), one or more storage devices 635, various types of storage medium 636.

The system bus 640 link a wide variety of subsystems. As understood by those skilled in the art, a "bus" refers to a plurality of digital signal lines serving a common function. The system bus 640 can be any of several types of bus structures including a memory bus, a peripheral bus, and a local bus using any of a variety of bus architectures. By way of example and not limitation, such architectures include the Industry Standard Architecture (ISA) bus, Enhanced ISA (EISA) bus, the Micro Channel Architecture (MCA) bus, the Video Electronics Standards Association local (VLB) bus, the Peripheral Component Interconnect (PCI) bus, the PCI-Express bus (PCI-X), and the Accelerated Graphics Port (AGP) bus.

Processor(s) 601 (also referred to as central processing units, or CPUs) optionally contain a cache memory unit 602 for temporary local storage of instructions, data, or computer addresses. Processor(s) 601 are coupled to storage devices including memory 603. Memory 603 includes random access memory (RAM) 604 and read-only memory (ROM) 605. As is well known in the art, ROM 605 acts to transfer data and instructions uni-directionally to the processor(s) 601, and RAM 604 is used typically to transfer data and instructions in a bi-directional manner. Both of these types of memories can include any suitable of the computer-readable media described below.

A fixed storage 608 is also coupled bi-directionally to the processor(s) 601, optionally via a storage control unit 607. It provides additional data storage capacity and can also include any of the computer-readable media described below. Storage 608 can be used to store operating system 609, EXECs 610, application programs 612, data 611 and the like and is typically a secondary storage medium (such as a hard disk) that is slower than primary storage. It should be appreciated that the information retained within storage 608, can, in appropriate cases, be incorporated in standard fashion as virtual memory in memory 603.

Processor(s) 601 is also coupled to a variety of interfaces such as graphics control 621, video interface 622, input interface 623, output interface 624, storage interface 625, and these interfaces in turn are coupled to the appropriate devices. In general, an input/output device can be any of: video displays, track balls, mice, keyboards, microphones, touch-sensitive displays, transducer card readers, magnetic or paper tape readers, tablets, styluses, voice or handwriting recognizers, biometrics readers, or other computers. Processor(s) 601 can be coupled to another computer or telecommunications network 630 using network interface 620. With such a network interface 620, it is contemplated that the CPU 601 might receive information from the network 630, or might output information to the network in the course of performing the above-described method. Furthermore, method embodiments of the present disclosure can execute solely upon CPU 601 or can execute over a network 630 such as the Internet in conjunction with a remote CPU 601 that shares a portion of the processing.

According to various embodiments, when in a network environment, i.e., when computer system 600 is connected to network 630, computer system 600 can communicate with other devices that are also connected to network 630. Communications can be sent to and from computer system 600 via network interface 620. For example, incoming communications, such as a request or a response from another device, in the form of one or more packets, can be received from network 630 at network interface 620 and stored in selected sections in memory 603 for processing. Outgoing communications, such as a request or a response to another device, again in the form of one or more packets, can also be stored in selected sections in memory 603 and sent out to network 630 at network interface 620. Processor(s) 601 can access these communication packets stored in memory 603 for processing.

In addition, embodiments of the present disclosure further relate to computer storage products with a computer-readable medium that have computer code thereon for performing various computer-implemented operations. The media and computer code can be those specially designed and constructed for the purposes of the present disclosure, or they can be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as optical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter. Those skilled in the art should also understand that term "computer readable media" as used in connection with the presently disclosed subject matter does not encompass transmission media, carrier waves, or other transitory signals.

As an example and not by way of limitation, the computer system having architecture 600 can provide functionality as a result of processor(s) 601 executing software embodied in one or more tangible, computer-readable media, such as memory 603. The software implementing various embodiments of the present disclosure can be stored in memory 603 and executed by processor(s) 601. A computer-readable medium can include one or more memory devices, according to particular needs. Memory 603 can read the software from one or more other computer-readable media, such as mass storage device(s) 635 or from one or more other sources via communication interface. The software can cause processor (s) 601 to execute particular processes or particular parts of particular processes described herein, including defining data structures stored in memory 603 and modifying such data structures according to the processes defined by the software. In addition or as an alternative, the computer system can provide functionality as a result of logic hardwired or otherwise embodied in a circuit, which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

The invention claimed is:

1. A method for decoding a scalable video bitstream, comprising:

decoding at least one intra spatial direction mode for intra prediction for at least one sample of a base layer complying with a version of a video coding standard;

receiving coded information pertaining to at least one sample of an enhancement layer complying with the same version of the video coding standard, the at least one sample having at least one intra spatial prediction direction mode; and setting at least one Most Probable Mode (MPM) of the at least one sample of the enhancement layer to indicate that the at least one intra spatial prediction direction mode for the at least one sample of the enhancement layer is equal to the at least one intra spatial directional mode for the at least one sample of the base layer;

wherein there are no more than three MPMs in the base layer or the enhancement layer; and wherein the method further comprises decoding at least one syntax element S, which indicates whether the at least one intra spatial directional mode for the at least one sample of the enhancement layer is equal to the at least one MPM.

2. The method of claim 1, the at least one sample of the base layer having a first spatial position and the at least one sample of the enhancement layer having a second spatial position, further comprising upscaling such that the second spatial position spatially corresponds, after upscaling, to the first spatial position.

3. The method of claim 1, wherein the decoding comprises decoding the intra spatial directional mode for a block of samples of the base layer.

4. The method of claim 3, wherein the setting comprises setting at least one Most Probable Mode (MPM) for a block of samples of the enhancement layer.

5. The method of claim 4, wherein the block of samples of the base layer having a first spatial position and the block of samples of the enhancement layer having a second spatial position, further comprising upscaling such that the second spatial position spatially corresponds, after upscaling, to the first spatial position.

6. The method of claim 1, further comprising setting the at least one intra spatial directional mode for the at least one sample of the enhancement layer equal to the at least one MPM when the syntax element S indicates that the at least one intra spatial directional mode for the at least one sample of the enhancement layer is equal to the at least one MPM.

7. The method of claim 6, further comprising performing spatial intra prediction for the at least one sample of an enhancement layer according to the at least one intra spatial directional mode for the at least one sample of a base layer.

8. A non-transitory computer readable medium comprising a set of instructions to direct a processor to perform a method for decoding a scalable video bitstream, comprising:

decoding at least one intra spatial direction mode for intra prediction for at least one sample of a base layer complying with a version of a video coding standard;

receiving coded information pertaining to at least one sample of an enhancement layer complying with the same version of the video coding standard, the at least one sample having at least one intra spatial prediction direction mode; and setting at least one Most Probable Mode (MPM) of the at least one sample of the enhancement layer to indicate that the at least one intra spatial prediction direction mode for the at least one sample of the enhancement layer is equal to the at least one intra spatial directional mode for the at least one sample of the base layer;

wherein there are no more than three MPMs in the base layer or the enhancement layer; and further comprising a set of instructions to direct the processor to perform decoding at least one syntax element S which indicates whether the at least one intra spatial directional mode for the at least one sample of the enhancement layer is equal to the at least one MPM.

9. The non-transitory computer readable medium of claim 8, the at least one sample of the base layer having a first spatial position and the at least one sample of the enhancement layer having a second spatial position, further comprising a set of instructions to direct the processor to perform upscaling such that the second spatial position spatially corresponds, after upscaling, to the first spatial position.

10. The non-transitory computer readable medium of claim 8, wherein the decoding comprises decoding the intra spatial directional mode for a block of samples of the base layer.

11. The non-transitory computer readable medium of claim 10, wherein the setting comprises setting at least one Most Probable Mode (MPM) for a block of samples of the enhancement layer.

12. The non-transitory computer readable medium of claim 11, wherein the block of samples of the base layer having a first spatial position and the block of samples of the enhancement layer having a second spatial position, further comprising a set of instructions to direct the processor to perform upscaling such that the second spatial position spatially corresponds, after upscaling, to the first spatial position.

13. The non-transitory computer readable medium of claim 8, further comprising a set of instructions to direct the processor to perform setting the at least one intra spatial directional mode for the at least one sample of the enhancement layer equal to the at least one MPM when the syntax element S indicates that the at least one intra spatial directional mode for the at least one sample of the enhancement layer is equal to the at least one MPM.

14. The non-transitory computer readable medium of claim 13, further comprising a set of instructions to direct the processor to perform spatial intra prediction for the at least one sample of an enhancement layer according to the at least one intra spatial directional mode for the at least one sample of a base layer.

15. A video coder for decoding a bitstream, comprising:

at least one processor; and at least one non-transitory computer readable medium comprising a set of instructions to direct the at least one processor to:

(a) receive at least one sample of a base layer and decode at least one intra spatial direction mode for intra prediction for the at least one sample of the base layer complying with a version of a video coding standard; and (b) receive coded information for the at least one sample of the base layer, and configured to set at least one Most Probable Mode (MPM) of at least one sample of an enhancement layer to indicate that the at least one intra spatial prediction direction mode for the at least one sample of the enhancement layer is equal to the at least one intra spatial directional mode for the at least one sample of the base layer, the enhancement layer complying with the same version of the video coding standard, wherein there are no more than three MPMs in the base layer or the enhancement layer; and (c) perform decoding at least one syntax element S which indicates whether the at least one intra spatial directional mode for the at least one sample of the enhancement layer is equal to the at least one MPM.

16. The video coder of claim 15, further comprising a set of instructions to direct the at least one processor to receive a bitstream and split the bitstream into base layer bits and enhancement layer bits.

17. The video coder of claim 15, further comprising a set of instructions to direct the at least one processor to upsample the at least one sample of the base layer.

18. The video coder of claim 15, further comprising a set of instructions to direct the at least one processor to upscale coded information for the at least one sample of the base layer.

19. The video coder of claim 15, further comprising a set of instructions to direct the at least one processor to extract coded information from the at least one sample of the enhancement layer.

20. The video coder of claim 19, further comprising a set of instructions to direct the at least one processor to receive the coded information pertaining to the at least one sample of the enhancement layer.

21. The video coder of claim 20, further comprising a set of instructions to direct the at least one processor to receive coded information for the at least one sample of the base layer and to determine an enhancement layer intra prediction based on at least one of coded information pertaining to the at least one sample of the enhancement layer and the coded information for the at least one sample of the base layer.

* * * * *